(12) United States Patent
Yukumoto et al.

(10) Patent No.: US 11,059,011 B2
(45) Date of Patent: Jul. 13, 2021

(54) REFORMING DEVICE AND REFORMING SYSTEM

(71) Applicant: MITSUBISHI HEAVY INDUSTRIES, LTD., Tokyo (JP)

(72) Inventors: Atsuhiro Yukumoto, Tokyo (JP); Shinya Tachibana, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 29 days.

(21) Appl. No.: 16/672,969

(22) Filed: Nov. 4, 2019

(65) Prior Publication Data
US 2020/0139325 A1 May 7, 2020

(30) Foreign Application Priority Data

Nov. 7, 2018 (JP) .............................. JP2018-209530

(51) Int. Cl.
*B01J 8/06* (2006.01)
*B01J 8/04* (2006.01)
*C01B 3/38* (2006.01)

(52) U.S. Cl.
CPC ............ *B01J 8/067* (2013.01); *B01J 8/0492* (2013.01); *B01J 8/0496* (2013.01); *B01J 8/062* (2013.01); *B01J 8/065* (2013.01); *C01B 3/384* (2013.01); *B01J 2208/00176* (2013.01); *B01J 2208/00504* (2013.01); *B01J 2208/065* (2013.01); *C01B 2203/0238* (2013.01); *C01B 2203/0816* (2013.01); *C01B 2203/0883* (2013.01); *C01B 2203/1241* (2013.01); *C01B 2203/141* (2013.01); *C01B 2203/142* (2013.01)

(58) Field of Classification Search
CPC .......................... B01D 71/02; B01J 8/06–067
See application file for complete search history.

(56) References Cited

U.S. PATENT DOCUMENTS

| 4,071,330 A * | 1/1978 | Sederquist | B01J 8/062 252/373 |
| 2002/0146359 A1* | 10/2002 | Lomax, Jr. | C01B 3/48 423/652 |
| 2009/0123348 A1* | 5/2009 | Brady | B01J 8/067 422/629 |
| 2009/0274593 A1* | 11/2009 | Fischer | B01J 8/02 422/198 |

(Continued)

FOREIGN PATENT DOCUMENTS

JP 5972678 8/2016

OTHER PUBLICATIONS

J.-W. Snoeck et. al, "Kinetic Study of the Carbon Filament Formation by Methane Cracking on a Nickel Catalyst", Journal of Catalysis, vol. 169, Issue 1, Jul. 1, 1997, pp. 250-262.

*Primary Examiner* — Matthew J Merkling
(74) *Attorney, Agent, or Firm* — Wenderoth, Lind & Ponack, L.L.P.

(57) ABSTRACT

A reforming device 1 for producing a reformed gas from a methane-containing gas containing methane and carbon dioxide includes a reforming reaction tube 10 containing a catalyst layer 12 filled with a reforming catalyst 12a for reforming the methane-containing gas, and a multilayer pipe 103 for spraying a cooling fluid to an outer peripheral surface of the reforming reaction tube 10 at a position corresponding to a gas inlet of the catalyst layer 12 in a length direction of the catalyst layer 12.

4 Claims, 11 Drawing Sheets

(56) References Cited

U.S. PATENT DOCUMENTS

2014/0107235 A1* 4/2014 Gamlin ............... B01J 8/0415
518/706
2015/0021279 A1* 1/2015 Hong ................ B01J 19/305
210/760

* cited by examiner

REFORMING DEVICE AND REFORMING SYSTEM

TECHNICAL FIELD

The present disclosure relates to a reforming device, a method of producing reformed gas, and a reforming system.

BACKGROUND ART

Methane reforming technique using carbon dioxide is known from Patent Document 1. Patent Document 1 describes dry reforming reaction. In the dry reforming reaction, reaction of 1 mol of methane with 1 mol of carbon dioxide produces reformed gas containing 2 mol of hydrogen and 2 mol of carbon monoxide.

CITATION LIST

Patent Literature

Patent Document 1: JP5972678B (see paragraph [0001], for example)

SUMMARY

Reforming is performed by supplying a gas containing methane (methane-containing gas) to a reforming reaction tube (heating furnace reaction tube) disposed in a reforming furnace (heating furnace). When the methane-containing gas flows through the reforming reaction tube, the temperature in the reforming reaction tube rises by heat supplied from a combustor installed in the reforming furnace. Due to thermal resistance of a gas boundary film in the vicinity of an inner wall of the reforming reaction tube (in the vicinity of the inside of the tube wall), the heat is not easily transferred to the center of the reforming reaction tube, and the heat supplied from the outside of the reaction tube accumulates in the vicinity of the inner wall of the reaction tube, which causes rapid temperature rise. As a result, methane contained in the methane-containing gas is thermally decomposed particularly in the vicinity of the inside of the tube wall, so that solid carbon is easily deposited.

The solid carbon deposit in a reforming catalyst hinders the contact between the reforming catalyst and the methane-containing gas and reduces the catalyst reaction efficiency. This also leads to an increase in pressure loss in the reformer, and the reduced gas pressure affects subsequent processes. Further, when carbon is deposited in a path connecting inside and outside of pores in which reforming reaction is performed, the pores may be blocked and the reforming catalyst may break. Therefore, it is desired to sufficiently suppress the deposition of solid carbon.

In particular, in the dry reforming reaction, when the supply amount of carbon dioxide (content ratio of carbon dioxide to methane in methane-containing gas) is increased to increase the production amount of hydrogen, the specific heat of methane-containing gas is decreased. Specifically, for example, in 20 kg/cm$^2$ of methane-containing gas (containing 3 mol of steam per mol of methane) at 600° C., when the content ratio (mole ratio) of carbon dioxide to methane is 0.6, the specific heat is 0.545 kcal/(kg·C°). However, in this methane-containing gas, when the content ratio (mole ratio) of carbon dioxide to methane becomes 1, the specific heat is decreased to 0.505 kcal/(kg·C°). Note that, in this methane-containing gas, when the content ratio (mole ratio) of carbon dioxide to methane is 0 (i.e., when no carbon dioxide is contained), the specific heat is 0.642 kcal/(kg·C°).

As the specific heat is decreased, gas temperature greatly rises inside the reforming reaction tube even at the same heat flux (heat supply rate). In particular, this tendency is significant at the inlet of the reforming catalyst (catalyst layer inlet) where the methane-containing gas has a low temperature, and solid carbon tends to deposit particularly at the catalyst layer inlet in the vicinity of the inside of the tube wall. Therefore, a reforming technique that can increase the hydrogen production amount while suppressing the deposition of solid carbon is desired.

The present disclosure was made in view of the above problems, and an object of at least one embodiment of the present invention is to provide a reforming device and a reforming system that can achieve both an increase in hydrogen production amount and a suppression of the deposition of solid carbon.

(1) A reforming device according to at least one embodiment of the present invention for producing a reformed gas from a methane-containing gas containing methane and carbon dioxide comprises: a reforming reaction tube containing a catalyst layer filled with a reforming catalyst for reforming the methane-containing gas; and a spray device for spraying a cooling fluid to an outer peripheral surface of the reforming reaction tube at a position corresponding to a gas inlet of the catalyst layer in a length direction of the catalyst layer.

With the above configuration (1), even if the proportion of carbon dioxide in the methane-containing gas introduced to the catalyst layer is increased, it is possible to prevent rapid temperature rise due to a reduction in heat flux at the inlet of the catalyst layer, and it is possible to suppress thermal decomposition of methane. Thus, even if the proportion of carbon dioxide in the methane-containing gas is increased, it is possible to achieve both an increase in hydrogen production amount and a suppression of the deposition of solid carbon.

(2) In some embodiments, in the above configuration (1), the spray device includes a multilayer pipe including at least a first pipe through which the methane-containing gas flows and a second pipe which is disposed outside the first pipe and through which the cooling fluid flows.

With the above configuration (2), it is possible to suppress heat transfer from the periphery of the first pipe to the methane-containing gas flowing through the first pipe and prevent rapid temperature rise of the methane-containing gas.

(3) In some embodiments, in the above configuration (2), the second pipe opens to a combustion space of a reforming furnace including a combustor for supplying heat to the catalyst layer, and the reforming device is configured to supply air contained in the cooling fluid to the combustion space.

With the above configuration (3), after heat transfer at the periphery of the first pipe is suppressed by air contained in the cooling fluid, the air used for cooling can be used as an oxygen supply source for combustion in the reforming furnace.

(4) In some embodiments, in any one of the above configurations (1) to (3), a temperature of the cooling fluid is equal to or lower than a first temperature at which solid carbon is deposited when the methane-containing gas is introduced to the catalyst layer.

With the above configuration (4), it is possible to sufficiently reduce heat flux to the methane-containing gas, and it is possible to more reliably suppress the solid carbon deposition at the inlet of the catalyst layer.

(5) A reforming device according to at least one embodiment of the present invention for producing a reformed gas from a methane-containing gas containing methane and carbon dioxide comprises: a reforming reaction tube containing a catalyst layer filled with a reforming catalyst for reforming the methane-containing gas; and a heat insulator disposed on an outer peripheral surface of the reforming reaction tube at a position corresponding to a gas inlet of the catalyst layer in a length direction of the catalyst layer.

With the above configuration (5), thermal resistance to the methane-containing gas is increased by the heat insulator disposed at the inlet of the catalyst layer. Thereby, it is possible to prevent rapid temperature rise due to a reduction in heat flux, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

(6) In some embodiments, in the above configuration (5), the heat insulator has a thickness such that a temperature of the methane-containing gas is equal to or lower than a first temperature at which solid carbon is deposited when the methane-containing gas is introduced to the catalyst layer.

With the above configuration (6), it is possible to sufficiently reduce heat flux to the methane-containing gas, and it is possible to more reliably suppress the solid carbon deposition at the inlet of the catalyst layer.

(7) A reforming device according to at least one embodiment of the present invention for producing a reformed gas from a methane-containing gas containing methane and carbon dioxide comprises a reforming reaction tube containing a catalyst layer filled with a reforming catalyst for reforming the methane-containing gas. The catalyst layer includes a first catalyst layer disposed on the upstream side with respect to gas flow and a second catalyst layer disposed on the downstream side of the first catalyst layer with respect to gas flow in a cross-sectional view in a gas flow direction, and the first catalyst layer is configured to promote turbulence of a gas flowing through the first catalyst layer compared to a gas flowing through the second catalyst layer; or a catalytic activity of a first reforming catalyst contained in the first catalyst layer is higher than a catalytic activity of a second reforming catalyst contained in the second catalyst layer.

With the above configuration (7), even if the proportion of carbon dioxide in the methane-containing gas introduced to the catalyst layer is increased, by promoting heat transfer to the methane-containing gas in the vicinity of the tube inner wall at the inlet of the catalyst layer, it is possible to promote heat transfer to the methane-containing gas cooled by reforming reaction (endothermic reaction) in the middle of the tube. Thereby, it is possible to prevent rapid temperature rise in the vicinity of the tube inner wall, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

(8) A reforming device according to at least one embodiment of the present invention for producing a reformed gas from a methane-containing gas containing methane and carbon dioxide comprises a reforming reaction tube containing a catalyst layer filled with a reforming catalyst for reforming the methane-containing gas. The catalyst layer includes a first catalyst layer and a second catalyst layer disposed so as to be surrounded by the first catalyst layer in a cross-sectional view perpendicular to a gas flow direction, and the first catalyst layer is configured to promote turbulence of a gas flowing through the first catalyst layer compared to a gas flowing through the second catalyst layer; or a catalytic activity of a first reforming catalyst contained in the first catalyst layer is higher than a catalytic activity of a second reforming catalyst contained in the second catalyst layer.

With the above configuration (8), even if the proportion of carbon dioxide in the methane-containing gas introduced to the catalyst layer is increased, by promoting heat transfer to the methane-containing gas in the vicinity of the tube inner wall at the inlet of the catalyst layer, it is possible to promote heat transfer to the methane-containing gas cooled by reforming reaction (endothermic reaction) in the middle of the tube. Thereby, it is possible to prevent rapid temperature rise in the vicinity of the tube inner wall, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

(9) A reforming system according at least one embodiment of the present invention for producing a reformed gas from a methane-containing gas containing methane and carbon dioxide comprises: the reforming device described in any one of the above (1) to (8), including a first reforming device and a second reforming device; a methane-containing gas supply system for supplying the methane-containing gas to the reforming device, including a first methane-containing gas supply system for supplying the methane-containing gas to the first reforming device and a second methane-containing gas supply system for supplying methane-containing gas to the second reforming device; an additional steam supply system for additionally supplying steam to the methane-containing gas supplied to the first reforming device; and a first reformed gas discharge system for supplying a reformed gas produced in the first reforming device to the second reforming device.

With the above configuration (9), even if the proportion of carbon dioxide in the methane-containing gas introduced to the catalyst layer is increased, the temperature is lower than the carbon deposition temperature at equilibrium, and it is possible suppress thermal decomposition of methane. Thus, even if the proportion of carbon dioxide in the methane-containing gas is increased, it is possible to achieve both an increase in hydrogen production amount and a suppression of the deposition of solid carbon. In particular, the second reforming device is supplied with carbon dioxide that has not react in the first reforming device. As a result, it is possible to suppress thermal decomposition of methane causing solid carbon deposits, and it is possible to further increase the hydrogen production amount.

At least one embodiment of the present invention provides a reforming device and a reforming system that can achieve both an increase in hydrogen production amount and a suppression of the deposition of solid carbon.

DETAILED DESCRIPTION

Figure 1:
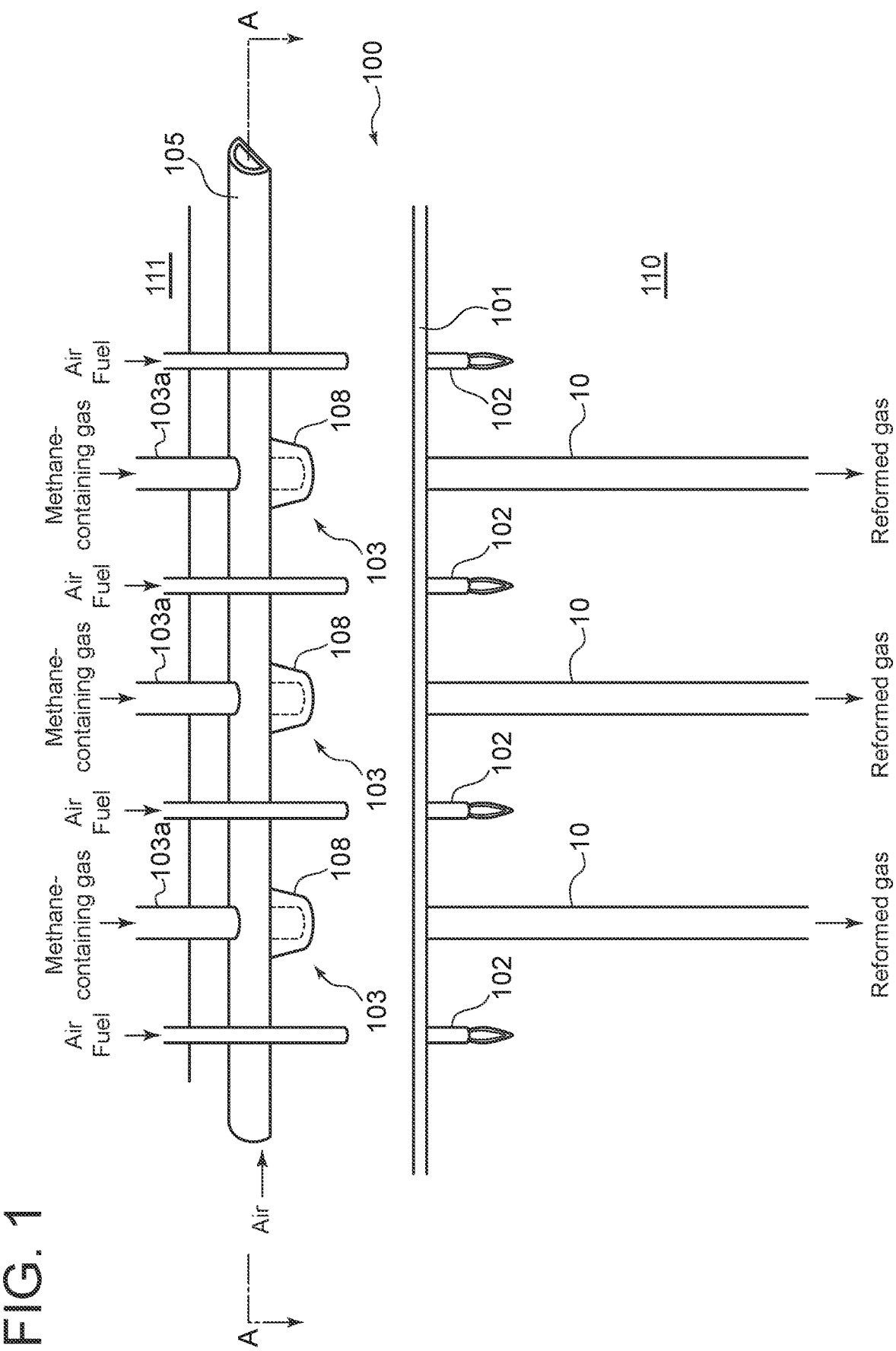
FIG. 1 is a perspective view of a reforming furnace including a reforming device according to a first embodiment of the present invention.

Embodiments of the present invention will now be described in detail with reference to the accompanying drawings. However, the following embodiments and the drawings are illustrative only, and various modifications may be applied as long as they do not depart from the object of the present invention. Further, two or more embodiments may be optionally combined in any manner. Further, in the following embodiments, similar elements will be indicated by the same reference numerals, and redundant descriptions thereof will be omitted for convenience.

It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIG. 1 is a perspective view of a reforming furnace 100 including a reforming device 1 according to the first embodiment of the present invention. The reforming furnace 100 includes a combustion space 110 and a furnace outside space 111 separated from the combustion space 110 by a ceiling 101. The reforming furnace 100 is provided with a reforming device 1 for producing a reformed gas from a methane-containing gas containing methane and carbon dioxide (e.g., mixed gas of natural gas and carbon dioxide). The methane-containing gas may contain steam in addition to methane and carbon dioxide. When the methane-containing gas contains steam, the amount ratio (mole ratio, S/C) of steam to methane may be any ratio. For example, S/C may be 3 or less.

The reforming device 1 includes a reforming reaction tube 10 and a spray device 108. The reforming reaction tube 10 contains a catalyst layer 12 (see FIG. 3) filled with a reforming catalyst 12$a$ (see FIG. 3) for reforming the methane-containing gas. The reforming reaction tube 10 extends from the furnace outside space 111 through the ceiling 101 and passes through the combustion space 110. The catalyst layer 12 is disposed in the reforming reaction tube 10 at a position corresponding to the combustion space 110, as described later.

The combustor 102 generates flame 102$b$ (see FIG. 3) in the combustion space 110. The flame 102$b$ is generated by igniting a premixed gas of air and fuel flowing through a fuel flow passage 102$a$ (see FIG. 3) in the combustor 102 by an ignition device (not shown). The generated flame 102$b$ generates heat in the combustion space 110. The generated heat is transferred to the catalyst layer 12 disposed in the reforming reaction tube 10 via a tube wall of the reforming reaction tube 10. Thereby, the methane-containing gas flowing through the reforming reaction tube 10 is reformed.

The spray device 108 sprays a cooling fluid (air in the depicted example) to an outer peripheral surface of the reforming reaction tube 10 at a position corresponding to the gas inlet of the catalyst layer 12 in the length direction. The spray device 108 is connected to an air pipe 105 including a semi-circular pipe forming a semi-circular flow passage. The spray device 108 includes a multilayer pipe 103 including at least a first pipe 103$a$ through which the methane-containing gas flows and a second pipe 103$b$ (see FIG. 3) which is disposed outside the first pipe 103$a$ and through which the cooling fluid flows. The provision of the multilayer pipe 103 suppresses heat transfer from the periphery of the first pipe 103$a$ to the methane-containing gas flowing through the first pipe 103$a$ and prevents rapid temperature rise of the methane-containing gas.

Figure 2:
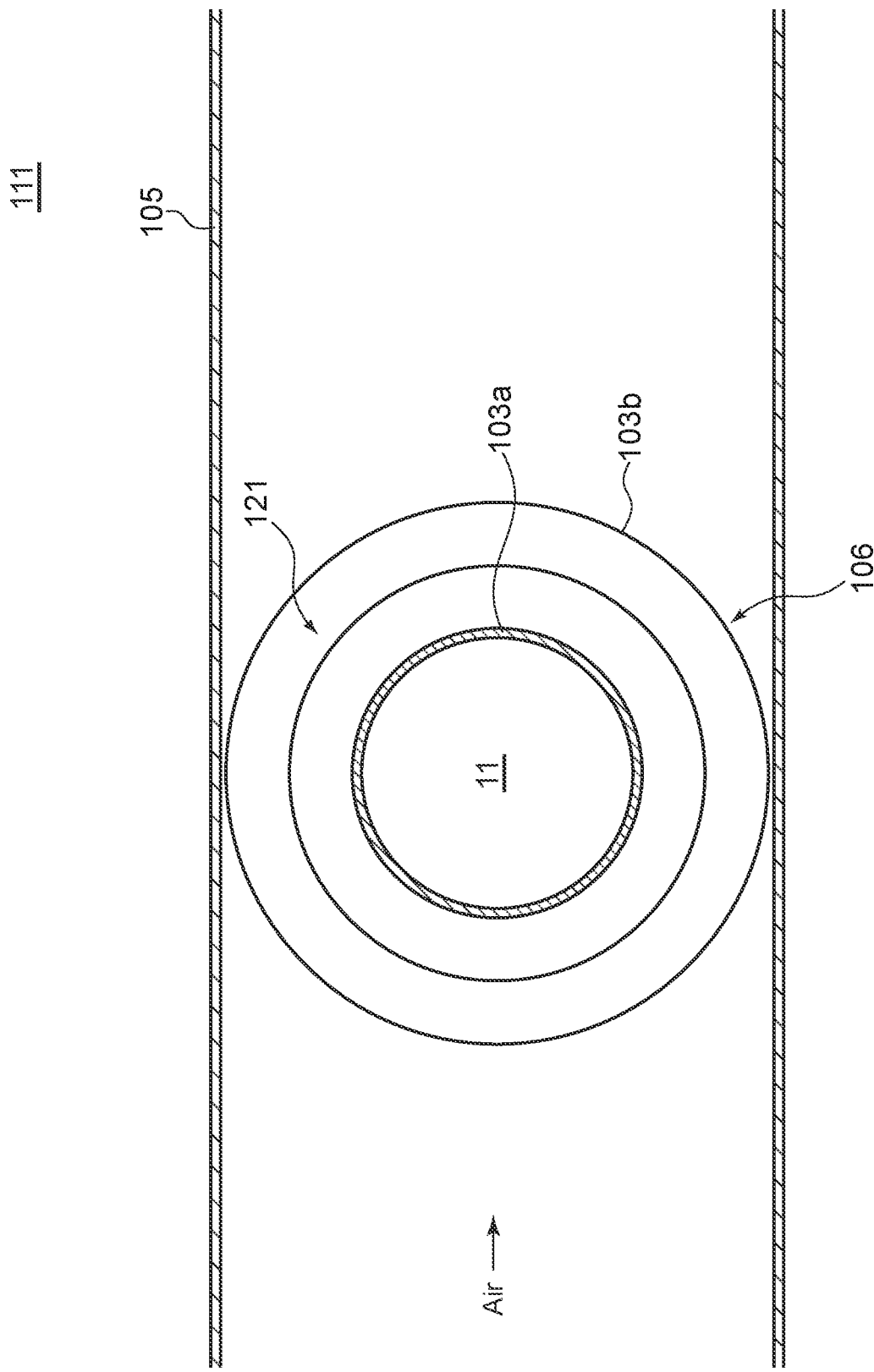
FIG. 2 is a cross-sectional view taken along line A-A in FIG. 1.

FIG. 2 is a cross-sectional view taken along line A-A in FIG. 1. In the first pipe 103$a$ constituting a part of the reforming reaction tube 10, a space 11 is formed in which the catalyst layer 12 is disposed.

The flow passage width of the semi-circular flow passage (i.e., the inner diameter of the semi-circular pipe) formed in the air pipe 105 is larger than the inner diameter (size) of an opening 106 of the second pipe 103$b$. Accordingly, the air pipe 105 is connected to the opening 106 so as to cover the entire opening 106 of the second pipe 103$b$. Further, the interior of the second pipe 103$b$ communicates with the interior of the air pipe 105 via the opening 106 formed at the upper end of the second pipe 103$b$. Thus, air flowing through the air pipe 105 flows into the second pipe 103$b$ via the opening 106. In particular, since air flows to the entire circumference of the second pipe 103b via the opening 106, uneven air flow is suppressed in the second pipe 103b.

Around the first pipe 103a, a circular opening 121 is formed in a portion of the ceiling 101. The opening 121 will now be described with reference to FIG. 3.

Figure 3:
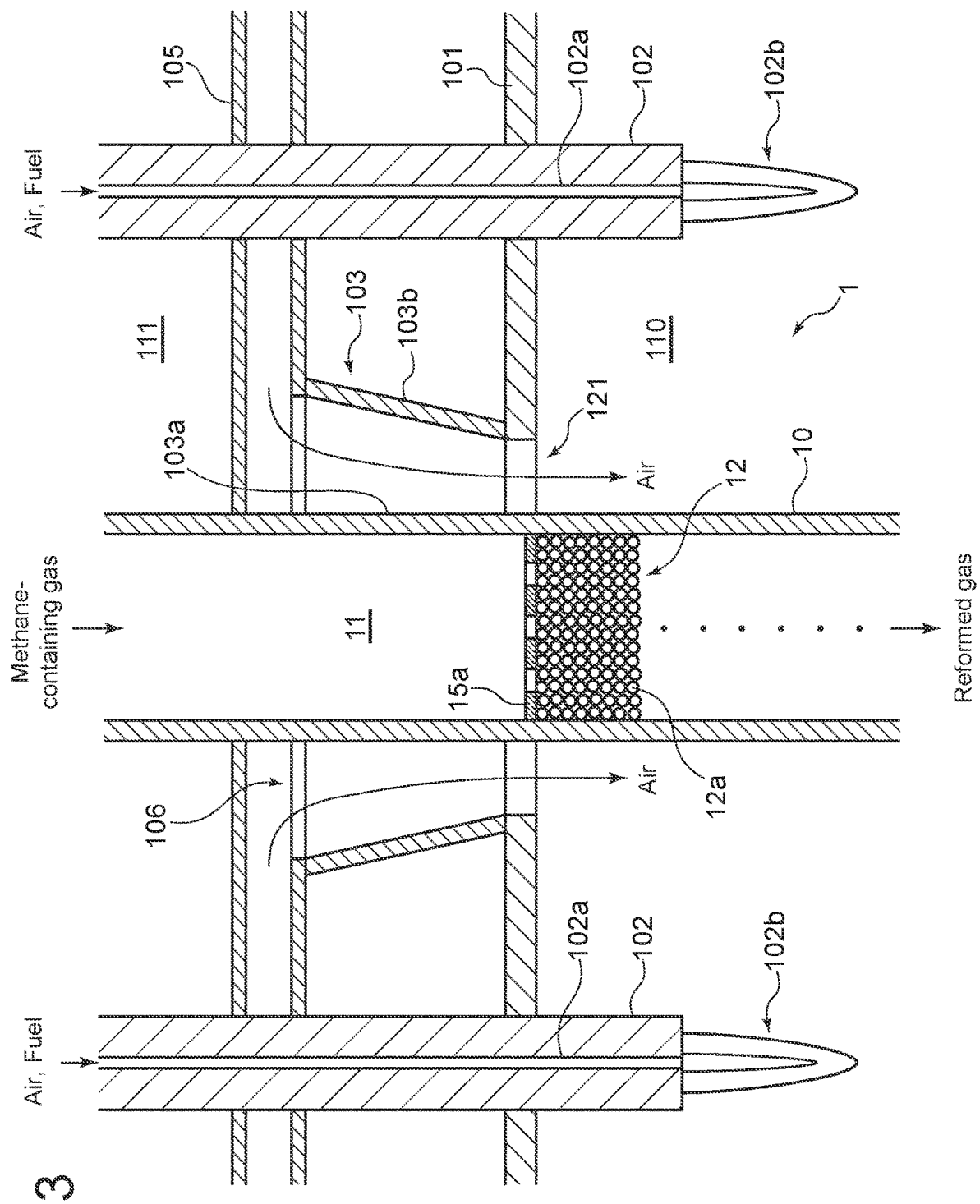
FIG. 3 is a cross-sectional view in the vicinity of a reforming device according to an embodiment of the present invention, taken along the gas flow direction.

FIG. 3 is a cross-sectional view in the vicinity of the reforming device 1 according to an embodiment of the present invention, taken along the gas flow direction. In FIG. 3, a part of the reforming catalyst 12a and the catalyst layer 12 is not depicted. In practical, the catalyst layer 12 is accommodated in the reforming reaction tube 10 over the entire height of the combustion space 110.

A porous plate 15a is disposed on top of the catalyst layer 12. Accordingly, the methane-containing gas flowing through the reforming reaction tube 10 from the furnace outside space 111 enters the catalyst layer 12 via the porous plate 15a. That is, the inlet of the catalyst layer 12 is formed at a connection portion between the porous plate 15a and the catalyst layer 12. The inlet of the catalyst layer 12 extends over the entire range in the right-left direction of the reforming reaction tube 10 in FIG. 3. Further, the height directional position of the inlet of the catalyst layer 12 coincides with the lower surface position of the ceiling 101. Accordingly, the whole of the catalyst layer 12 is disposed inside the combustion space 110.

Around the first pipe 103a, an opening 121 is formed in a portion of the ceiling 101. The opening 121 is formed in the combustion space 110 of the second pipe 103b. The second pipe 103b becomes narrower downstream with respect to the gas flow. The second pipe 103b opens to the combustion space 110 of the reforming furnace including the combustor 102 for supplying heat to the catalyst layer 12, and the reforming device 1 is configured to supply air contained in the cooling fluid flowing from the air pipe 105 to the second pipe 103b, to the combustion space 110. With this configuration, after heat transfer at the periphery of the first pipe 103a is suppressed by air contained in the cooling fluid, the air used for cooling can be used as an oxygen supply source for combustion in the reforming furnace.

The temperature of the cooling fluid for cooling the catalyst layer 12 accommodated in the reforming reaction tube 10 is equal to or lower than a first temperature at which solid carbon is deposited when the methane-containing gas is introduced to the catalyst layer 12. Here, the first temperature is preferably high in order to sufficiently suppress the solid carbon deposition due to carbon monoxide, for instance. Specifically, the first temperature is, for example, 350° C. or less, preferably 370° C. or less, more preferably 400° C. or less, although it cannot be generally stated because it varies depending on the content of carbon dioxide in the methane-containing gas. By cooling the methane-containing gas with the cooling fluid in this temperature range, it is possible to sufficiently reduce heat flux to the methane-containing gas, and it is possible to more reliably suppress the solid carbon deposition at the inlet of the catalyst layer 12.

The reforming catalyst 12a filled in the catalyst layer 12 includes any catalyst component capable of reforming methane. Illustrative examples of the catalyst component in the reforming catalyst 12a include nickel-based catalysts such as nickel and nickel oxide, and ruthenium-based catalysts in which ruthenium is supported on alumina; one or two or more of these components may be included. Further, the reforming catalyst 12a may have any shape, for example, an annular shape (see FIG. 9 described later, for example).

With the reforming reaction tube 10 having the above configuration, even if the proportion of carbon dioxide in the methane-containing gas introduced to the catalyst layer 12 is increased, it is possible to prevent rapid temperature rise due to a reduction in heat flux at the inlet of the catalyst layer 12, and it is possible to suppress thermal decomposition of methane. Thus, even if the proportion of carbon dioxide in the methane-containing gas is increased, it is possible to achieve both an increase in hydrogen production amount and a suppression of the deposition of solid carbon.

Figure 4:
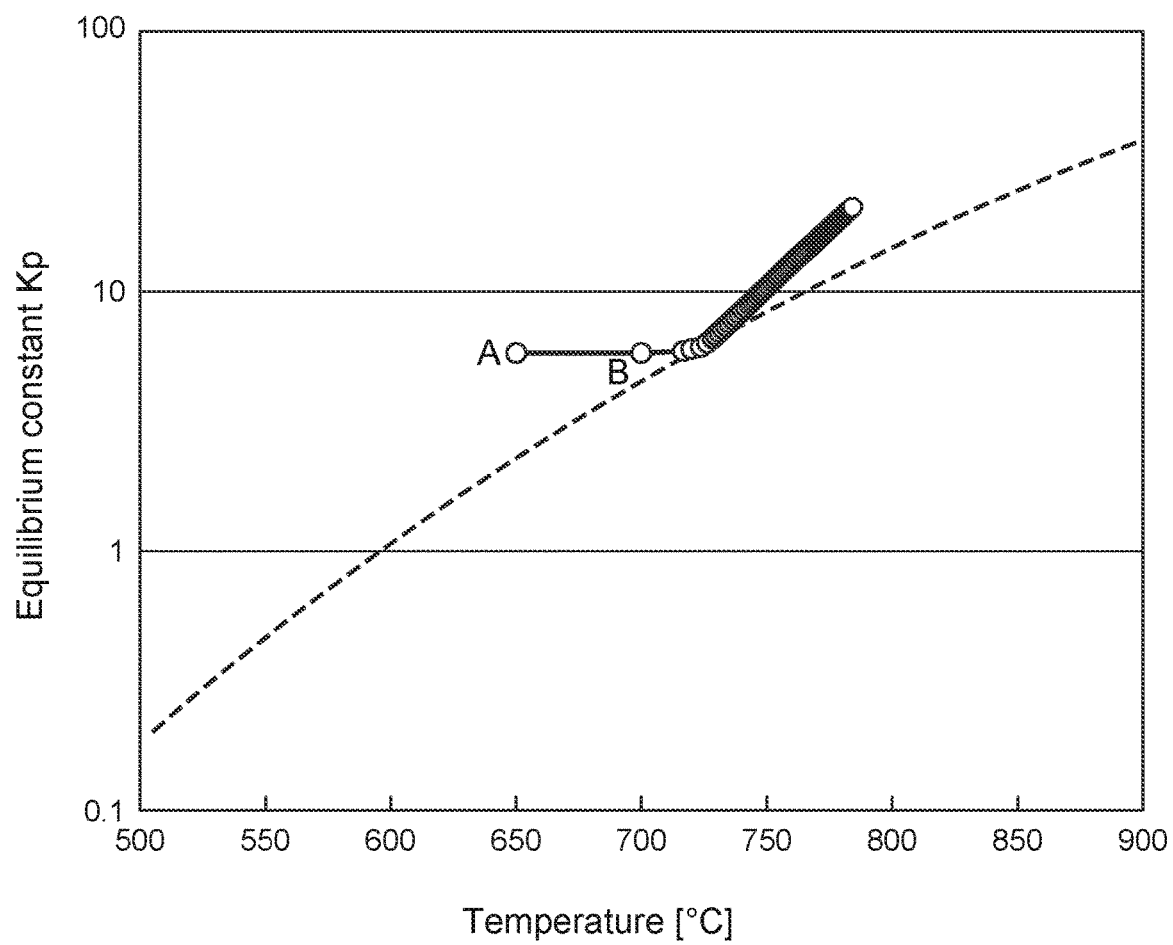
FIG. 4 is a graph showing a relationship between equilibrium constant and temperature in a reforming device (Example) according to an embodiment of the present invention.
Figure 5:
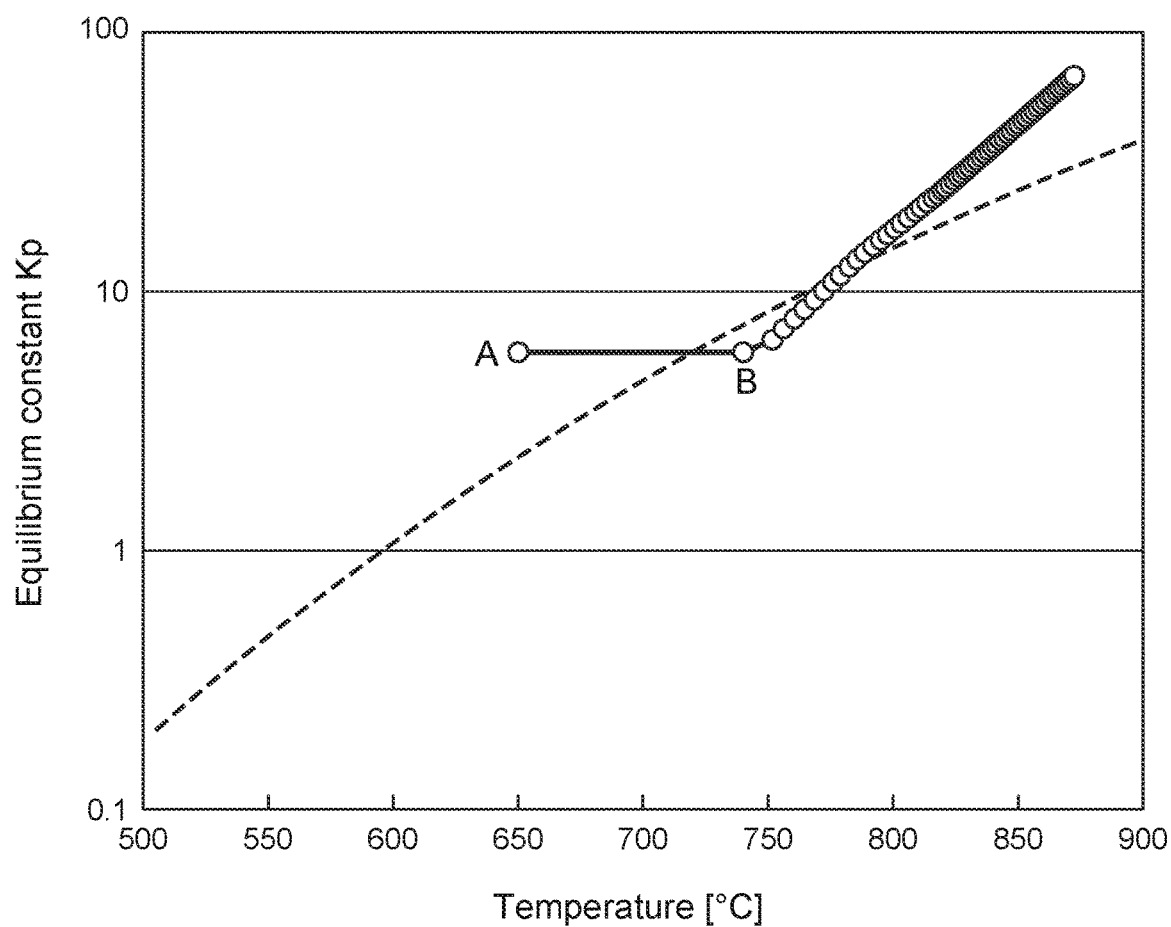
FIG. 5 is a graph showing a relationship between equilibrium constant and temperature in a conventional reforming device (Comparative Example).

FIG. 4 is a graph showing a relationship between equilibrium constant and temperature in the reforming device 1 (Example) according to an embodiment of the present invention. FIG. 5 is a graph showing a relationship between equilibrium constant and temperature in a conventional reforming device (Comparative Example). In the graphs shown in FIGS. 4 and 5, the temperature and equilibrium constant obtained based on simulation studies by the present inventors are plotted. The conventional reforming device herein includes the same configuration as the reforming device 1 according to an embodiment of the present invention except that the reforming device 1 does not include the spray device 108. In the reforming device 1 according to an embodiment of the present invention, owing to spraying of the cooling fluid with the spray device 108, heat flux at the inlet of the catalyst layer 12 is approximately half of the conventional reforming device.

In FIGS. 4 and 5, the plot A is temperature at the inlet of the catalyst layer 12 and equilibrium constant Kp of $CH_4 \rightarrow C+2H_2$ (see the following equation (1)). The plots continuing from the plot A in the right direction are temperature and equilibrium constant every 10 cm from the inlet of the catalyst layer 12. For instance, the plot B is temperature and equilibrium constant at 10 cm from the inlet of the catalyst layer 12. The temperature is temperature of a contact portion between the tube inner wall of the reforming reaction tube 10 and the catalyst layer 12 (temperature of the catalyst layer 12 in the vicinity of the tube wall). The equilibrium constant is determined based on the temperature and pressure measured by thermometers and pressure gauges disposed at the inlet and the outlet of the catalyst layer 12 and the composition of the methane-containing gas and the reformed gas obtained by reaction rate analysis.

Thermal decomposition of methane is expressed by the following equation (1):

$$CH_4 \rightarrow C(solid)+2H_2 \qquad \text{Equation (1)}$$

Since the equilibrium constant of equation (1) varies with temperature, carbon deposition line of equation (1) is as shown by the dotted line in FIGS. 4 and 5. This graph is cited from "J.-W. Snoeck et al., Journal of Catalysis, Volume 169, Issue 1, 1 Jul. 1997, pages 250-262 (reference document)". In the graph shown by the dotted line, the lower region is a region where solid carbon is deposited, and the upper region is a region where solid carbon is not deposited.

In the graph shown in FIG. 4 corresponding to Example, the plot A at the inlet of the catalyst layer 12 and the plot B 10 cm downstream of the inlet of the catalyst layer 12 are both in the upper region in the graph. More specifically, the temperature of the methane-containing gas at the inlet of the catalyst layer 12 (plot A) is 650° C. Further, the temperature of the methane-containing gas entering the catalyst layer 12 steeply rises and reaches 700° C. (plot B). However, the temperature increase from the plot A to the plot B is smaller than in the conventional example (described later with reference to FIG. 5) and does not cause deposition of solid carbon. Further, even downstream of the plot B with respect to the gas flow, the equilibrium constant does not enter the lower region, and the temperature gradually rises. Accordingly, in the reforming device 1 according to an embodiment of the present invention, solid carbon is not deposited in the catalyst layer 12.

Meanwhile, in the graph shown in FIG. 5 corresponding to Comparative Example, the temperature of the methane-containing gas at the inlet of the catalyst layer 12 is 650° C., and the plot A is in the upper region of the graph. However, the temperature of the methane-containing gas entering the catalyst layer 12 more steeply rises than FIG. 4 and reaches 740° C. (plot B). As a result, the plot B is in the lower region of the graph, which indicates solid carbon is deposited in the catalyst layer 12. Then, downstream of the plot B with respect to the gas flow, the gas temperature gradually rises, and the equilibrium constant returns to the upper region of the graph.

As shown in FIGS. 4 and 5, by reducing the temperature increase of the methane-containing gas entering the catalyst layer 12 from the inlet of the catalyst layer 12, carbon deposition in the catalyst layer 12 can be suppressed. In view of this, in the reforming device 1 according to an embodiment of the present invention, the cooling fluid is sprayed at the inlet of the catalyst layer 12 to reduce heat flux due to heat generated in the combustor 102. Thereby, it is possible to prevent rapid temperature rise of the methane-containing gas at the inlet of the catalyst layer 12, and it is possible to suppress thermal decomposition of methane.

In particular, as the proportion of carbon dioxide in the methane-containing gas increases, and the specific heat decreases, the temperature increase after entering the inlet of catalyst layer 12 increases. In this case, the reduction amount of heat flux may be increased by decreasing the temperature of the cooling fluid or increasing the spray amount of the cooling fluid. Thereby, it is possible to suppress the deposition of solid carbon in the catalyst layer 12 even when the methane-containing gas containing a large proportion of carbon dioxide is used.

Figure 6:
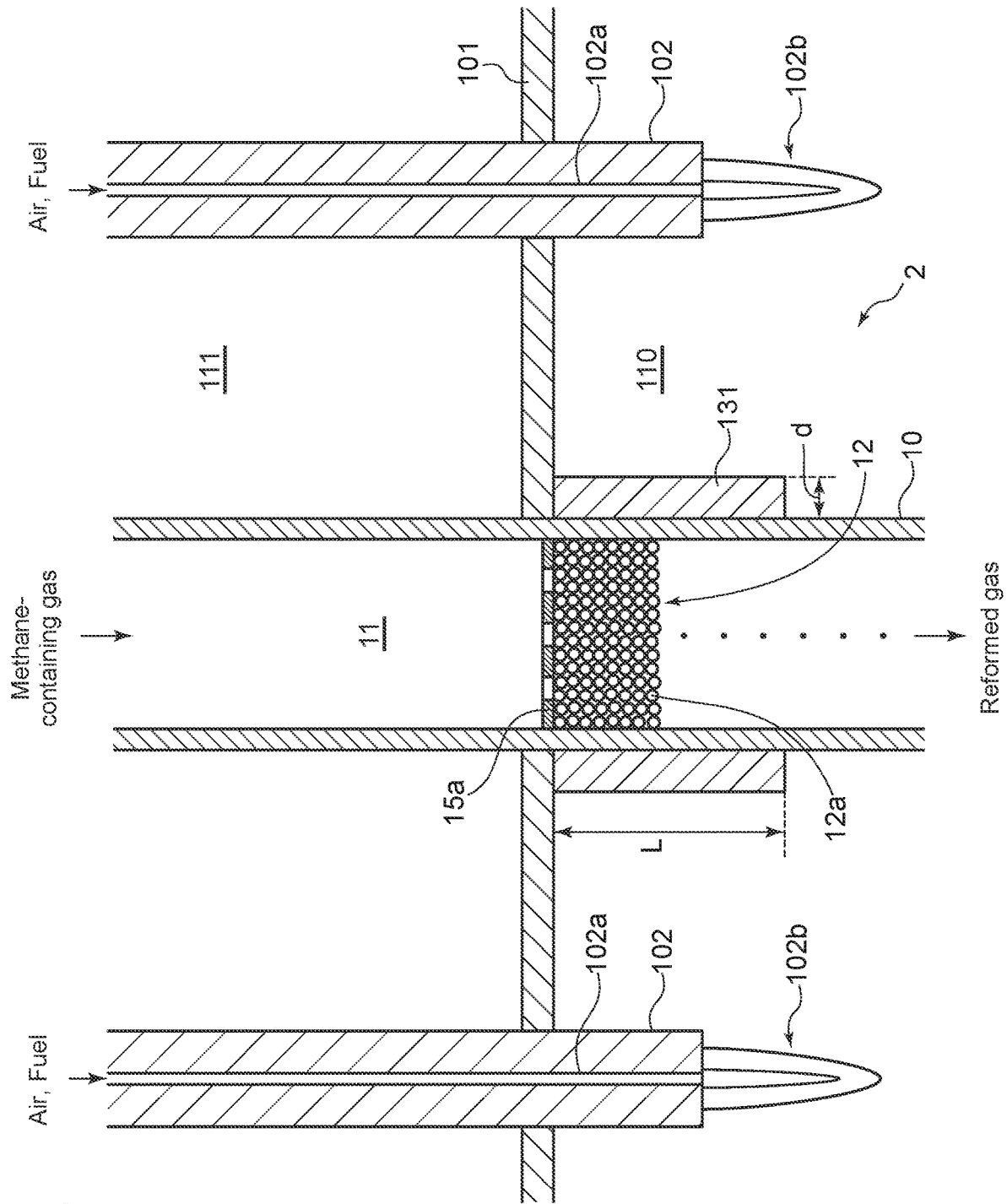
FIG. 6 is a cross-sectional view in the vicinity of a reforming device according to a second embodiment of the present invention, taken along the gas flow direction.

FIG. 6 is a cross-sectional view in the vicinity of a reforming device 2 according to the second embodiment of the present invention, taken along the gas flow direction. The reforming device 2 is configured to produce a reformed gas from a methane-containing gas containing methane and carbon dioxide, as with the reforming device 1 described above. The reforming device 2 includes a reforming reaction tube 10 and a heat insulator 131. The reforming reaction tube 10 of the reforming device 2 contains a catalyst layer 12 filled with a reforming catalyst 12a for reforming the methane-containing gas, as with the reforming reaction tube 10 of the reforming device 1.

The heat insulator 131 of the reforming device 2 is disposed on an outer peripheral surface of the reforming reaction tube 10 at a position corresponding to the gas inlet of the catalyst layer 12 in the length direction. That is, the heat insulator 131 is wound around the outer periphery of the reforming reaction tube 10 so that the inlet of the catalyst layer 12 accommodated in the reforming reaction tube 10 is positioned at a height equal to the upper surface of the heat insulator 131. The heat insulator 131 may include ceramic, for example.

When the heat insulator 131 is provided, thermal resistance to the methane-containing gas is increased by the heat insulator 131 disposed at the inlet of the catalyst layer 12. Thereby, it is possible to prevent rapid temperature rise due to a reduction in heat flux, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

The heat insulator 131 has a thickness d such that the temperature of the methane-containing gas is equal to or lower than the first temperature at which solid carbon is deposited when the methane-containing gas is introduced to the catalyst layer 12. By setting the thickness d of the heat insulator 131 in this range, it is possible to sufficiently reduce heat flux to the methane-containing gas, and it is possible to more reliably suppress the solid carbon deposition at the inlet of the catalyst layer 12.

The length L of the heat insulator 131 in the height direction may be generally about 50% or less, preferably 30% or less, more preferably 10% or less of the length of the catalyst layer 12 in the height direction.

Figure 7:
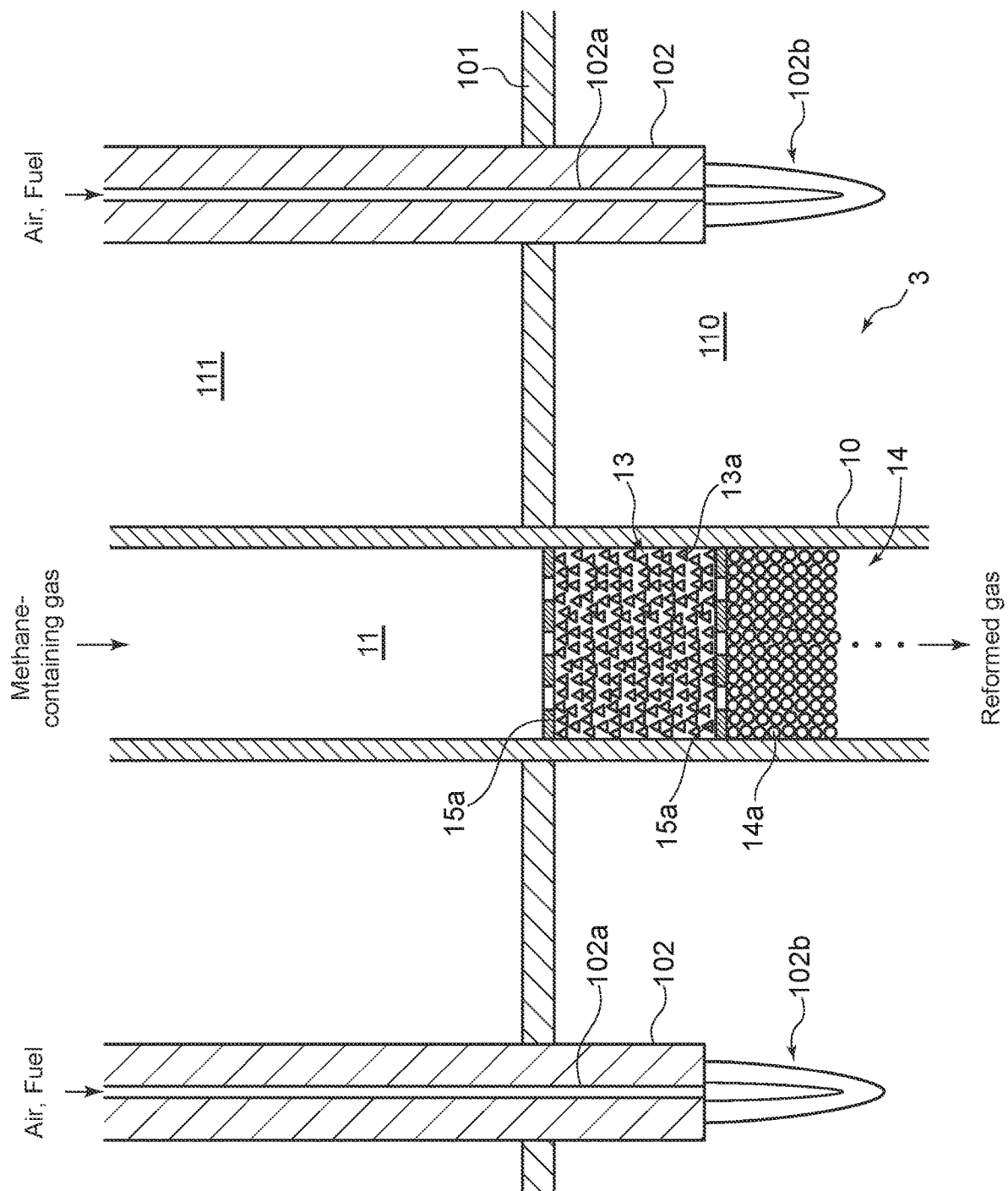
FIG. 7 is a cross-sectional view in the vicinity of a reforming device according to a third embodiment of the present invention, taken along the gas flow direction.

FIG. 7 is a cross-sectional view in the vicinity of a reforming device 3 according to the third embodiment of the present invention, taken along the gas flow direction. The reforming device 3 is configured to produce a reformed gas from a methane-containing gas containing methane and carbon dioxide, as with the reforming device 1 described above. The reforming device 3 includes a reforming reaction tube 10 having a catalyst layer 12 filled with a reforming catalyst (first reforming catalyst 13a and second reforming catalyst 14a) for reforming the methane-containing gas, as with the reforming device 1.

However, the catalyst layer 12 in the reforming reaction tube 10 of the reforming device 3 includes a first catalyst layer 13 disposed on the upstream side with respect to the gas flow and a second catalyst layer 14 disposed on the downstream side of the first catalyst layer 13 with respect to the gas flow in a cross-sectional view in the gas flow direction (cross-sectional view shown in FIG. 7). A porous plate 15a is disposed between the first catalyst layer 13 and the second catalyst layer 14.

The first catalyst layer 13 is configured to promote turbulence of the gas flowing through the first catalyst layer 13 compared to the gas flow flowing through the second catalyst layer 14. Specifically, a first reforming catalyst 13a filled in the first catalyst layer 13 has a geometrical feature (at least one of shape or size; the same shall apply hereinafter) that causes more turbulence of the gas flowing therethrough, than a second reforming catalyst 14a filled in the second catalyst layer 14. The geometry of the first reforming catalyst 13a and the second reforming catalyst 14a will be described with reference to FIGS. 8 and 9.

Figure 8:
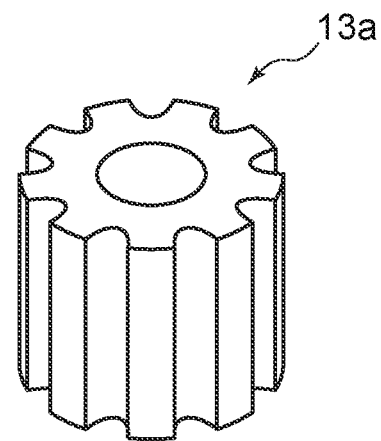
FIG. 8 is a perspective view of a first reforming catalyst filled in a first catalyst layer.
Figure 9:
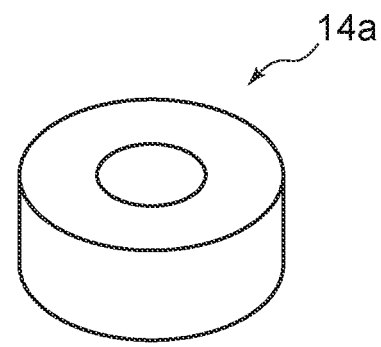
FIG. 9 is a perspective view of a second reforming catalyst filled in a second catalyst layer.

FIG. 8 is a perspective view of the first reforming catalyst 13a filled in the first catalyst layer 13. FIG. 9 is a perspective view of the second reforming catalyst 14a filled in the second catalyst layer 14. The lengths of the maximum portions of the first reforming catalyst 13a and the second reforming catalyst 14a are substantially the same, and the first reforming catalyst 13a and the second reforming catalyst 14a have substantially the same size. However, the first reforming catalyst 13a has a hollow cylindrical shape having an outer peripheral surface with a groove extending in the axial direction, while the second reforming catalyst 14a has a hollow cylindrical shape (ring-shape) having a smoothly curved outer peripheral surface.

In this way, the geometry of the first reforming catalyst 13a is complex than that of the second reforming catalyst 14a. Specifically, the first reforming catalyst 13a has a corrugated outer surface, so that the geometry of the first reforming catalyst 13a is more complex than the second reforming catalyst 14a which has a smoothly curved outer surface. Accordingly, when a gas flows through the first catalyst layer 13 filled with the first reforming catalyst 13a having complex geometry, the flow of the gas becomes more turbulent than through the second catalyst layer 14 filled with the second reforming catalyst 14a having a simpler shape than the first reforming catalyst 13a. As a result, since the turbulence is promoted on the upstream side with respect to the gas flow including the inlet of the catalyst layer 12 with a particularly high temperature increase, the gas flow becomes complex in the catalyst layer 12 (specifically, in the first catalyst layer 13). This complex flow disturbs a gas boundary film formed in the vicinity of the inside of the tube wall of the reforming reaction tube 10 and reduces the thermal resistance. As a result, thermal diffusion is likely to occur inside the catalyst layer 12, and the temperature rise in the vicinity of the inside of the tube wall is controlled. Thus, it is possible to suppress thermal decomposition of methane.

The geometry of the first reforming catalyst 13a and the second reforming catalyst 14a is not limited to the illustrated examples. For instance, catalysts described in catalyst catalogue (süd-chemie catalysts Ltd., published 2001) may be used appropriately.

Further, the catalytic activity of the first reforming catalyst 13a contained in the first catalyst layer 13 may be higher than the catalytic activity of the second reforming catalyst 14a contained in the second catalyst layer 14. Specifically, the reaction rate $(kmol/(m^3\text{-catalyst}\cdot h))$ of the first reforming catalyst 13a per unit catalyst volume may be higher than the reaction rate $(kmol/(m^3\text{-catalyst}\cdot h))$ of the second reforming catalyst 14a per unit catalyst volume. In this case, it is possible to promote reforming reaction, which is endothermic reaction, on the upstream side with respect to the gas flow including the inlet of the catalyst layer 12 with a particularly high temperature increase, and it is possible to rapidly decrease the temperature of the methane-containing gas entering the inlet of the catalyst layer 12. As a result, it is possible to reduce temperature increase in the vicinity of the inside of the tube wall. Thus, it is possible to suppress thermal decomposition of methane.

The components of the first reforming catalyst 13a and the second reforming catalyst 14a showing different catalytic activities are not limited to particular components. Examples of the first reforming catalyst 13a include ruthenium-based catalysts as described above. Examples of the second reforming catalyst 14a include nickel-based catalysts as described above. In a case where the first reforming catalyst 13a and the second reforming catalyst 14a show different catalytic activities, the geometry of the first reforming catalyst 13a and the geometry of the second reforming catalyst 14a may be the same or different.

With this reforming device 3, even if the proportion of carbon dioxide in the methane-containing gas introduced to the catalyst layer 12 is increased, by promoting heat transfer to the methane-containing gas in the vicinity of the tube inner wall at the inlet of the catalyst layer 12, it is possible to promote heat transfer to the methane-containing gas cooled by reforming reaction (endothermic reaction) in the middle of the tube. Thereby, it is possible to prevent rapid temperature rise in the vicinity of the tube inner wall, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

Figure 10:
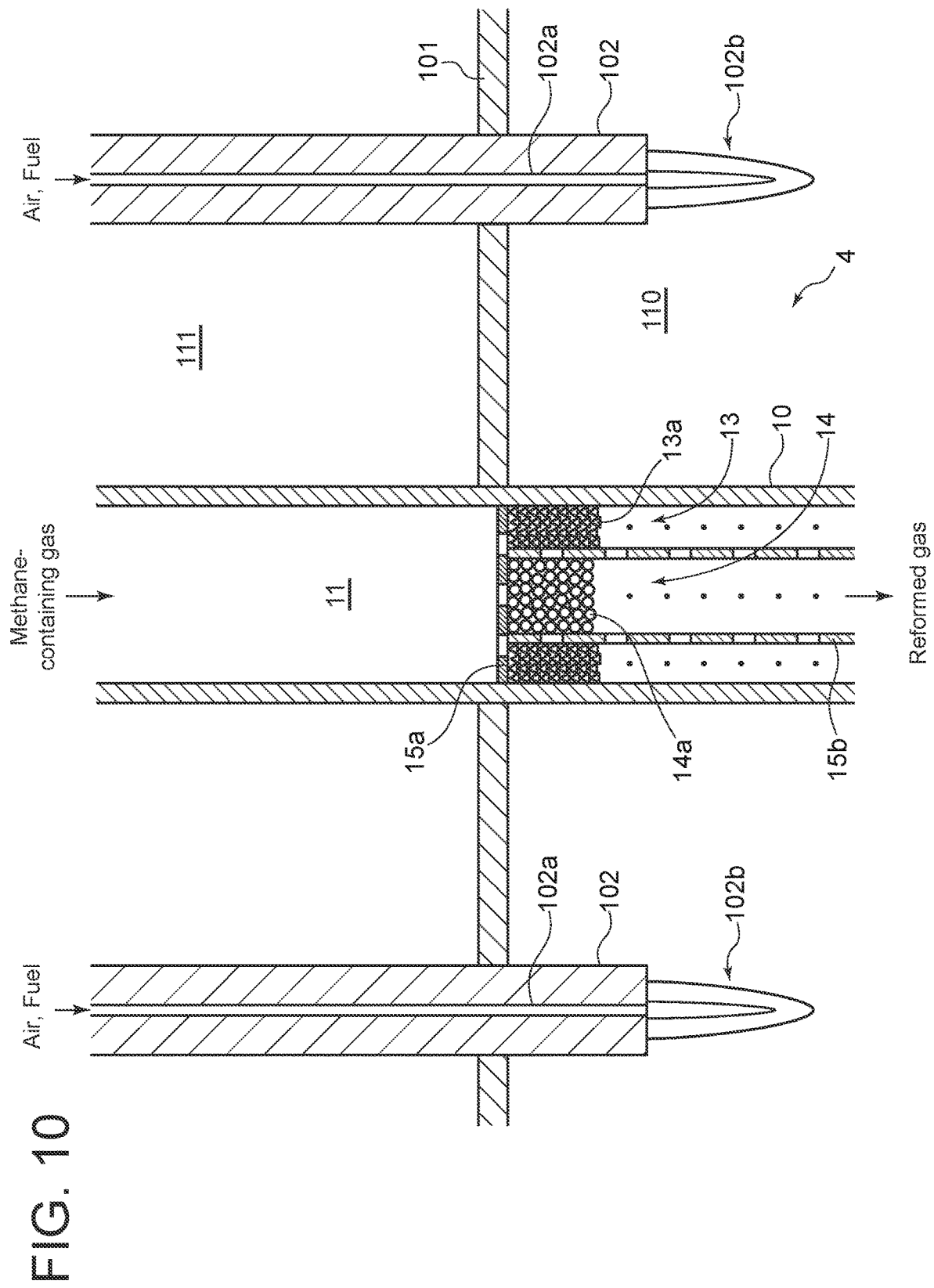
FIG. 10 is a cross-sectional view in the vicinity of a reforming device according to a fourth embodiment of the present invention, taken along the gas flow direction.

FIG. 10 is a cross-sectional view in the vicinity of a reforming device 4 according to the fourth embodiment of the present invention, taken along the gas flow direction. The reforming device 4 is configured to produce a reformed gas from a methane-containing gas containing methane and carbon dioxide, as with the reforming devices 1 to 3 described above. The reforming device 4 includes a reforming reaction tube 10 having a catalyst layer 12 filled with a reforming catalyst (first reforming catalyst 13a and second reforming catalyst 14a) for reforming the methane-containing gas, as with the reforming device 3 described above. The catalyst layer 12 includes a first catalyst layer 13 and a second catalyst layer 14. However, the position of the first catalyst layer 13 and the second catalyst layer 14 differs from the reforming device 4. This point will now be described with reference to FIG. 11.

Figure 11:
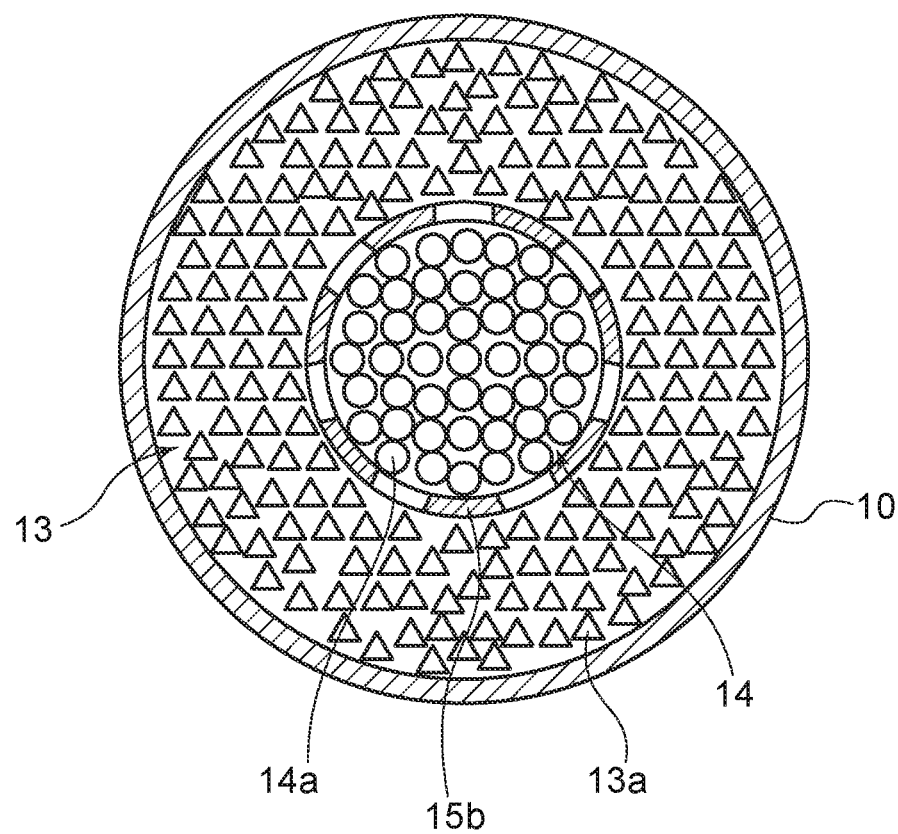
FIG. 11 is a cross-sectional view in the vicinity of a reforming device according to the fourth embodiment of the present invention, taken along a direction perpendicular to the gas flow direction.

FIG. 11 is a cross-sectional view in the vicinity of the reforming device 4 according to the fourth embodiment of the present invention, taken along a direction perpendicular to the gas flow direction. The catalyst layer 12 includes the first catalyst layer 13 and the second catalyst layer 14 disposed so as to be surrounded by the first catalyst layer 13 in a cross-sectional view perpendicular to the gas flow direction (cross-sectional view shown in FIG. 11). A porous tube 15b (also see FIG. 10) extending in the gas flow direction is disposed between the first catalyst layer 13 and the second catalyst layer 14. The first catalyst layer 13 is configured to promote turbulence of the gas flowing through the first catalyst layer 13 compared to the gas flow flowing through the second catalyst layer 14, as described in the reforming device 3.

The first reforming catalyst 13a filled in the first catalyst layer 13 may have geometry shown in FIG. 8 descried above, and the second reforming catalyst 14a filled in the second catalyst layer 14 may have geometry shown in FIG. 9 described above, for instance.

Thus, since the first catalyst layer 13 filled with the first reforming catalyst 13a having complex geometry is disposed in the vicinity of the inside of the tube wall, the gas flow becomes turbulent in the vicinity of the inside of the tube wall where the temperature tends to rise rapidly due to high thermal resistance. This flow disturbs a gas boundary film formed in the vicinity of the inside of the tube wall of the reforming reaction tube 10 and reduces the thermal resistance. As a result, thermal diffusion is likely to occur inside the catalyst layer 12, and the temperature rise in the vicinity of the interior of the tube wall is controlled. Thus, it is possible to suppress thermal decomposition of methane.

Further, the catalytic activity of the first reforming catalyst 13a contained in the first catalyst layer 13 may be higher than the catalytic activity of the second reforming catalyst 14a contained in the second catalyst layer 14, as with the reforming device 3 described above. In this case, it is possible to promote reforming reaction, which is endothermic reaction, in the vicinity of the inside of the tube wall where the temperature rises rapidly, and it is possible to rapidly decrease the temperature of the methane-containing gas entering the inlet of the catalyst layer 12. As a result, it is possible to reduce temperature increase in the vicinity of the inside of the tube wall. Thus, it is possible to suppress thermal decomposition of methane. In a case where the first reforming catalyst 13a and the second reforming catalyst 14a show different catalytic activities, the geometry of the first reforming catalyst 13a and the geometry of the second reforming catalyst 14a may be the same or different.

With this reforming device 3, even if the proportion of carbon dioxide in the methane-containing gas introduced to the catalyst layer 12 is increased, by promoting heat transfer to the methane-containing gas in the vicinity of the tube inner wall at the inlet of the catalyst layer 12, it is possible to promote heat transfer to the methane-containing gas cooled by reforming reaction (endothermic reaction) in the middle of the tube. Thereby, it is possible to prevent rapid temperature rise in the vicinity of the tube inner wall, and it is possible to suppress thermal decomposition of methane. As a result, even if the proportion of carbon dioxide in the methane-containing gas is increased, it is possible to achieve both an increase in hydrogen production amount and a suppression of the deposition of solid carbon.

Figure 12:
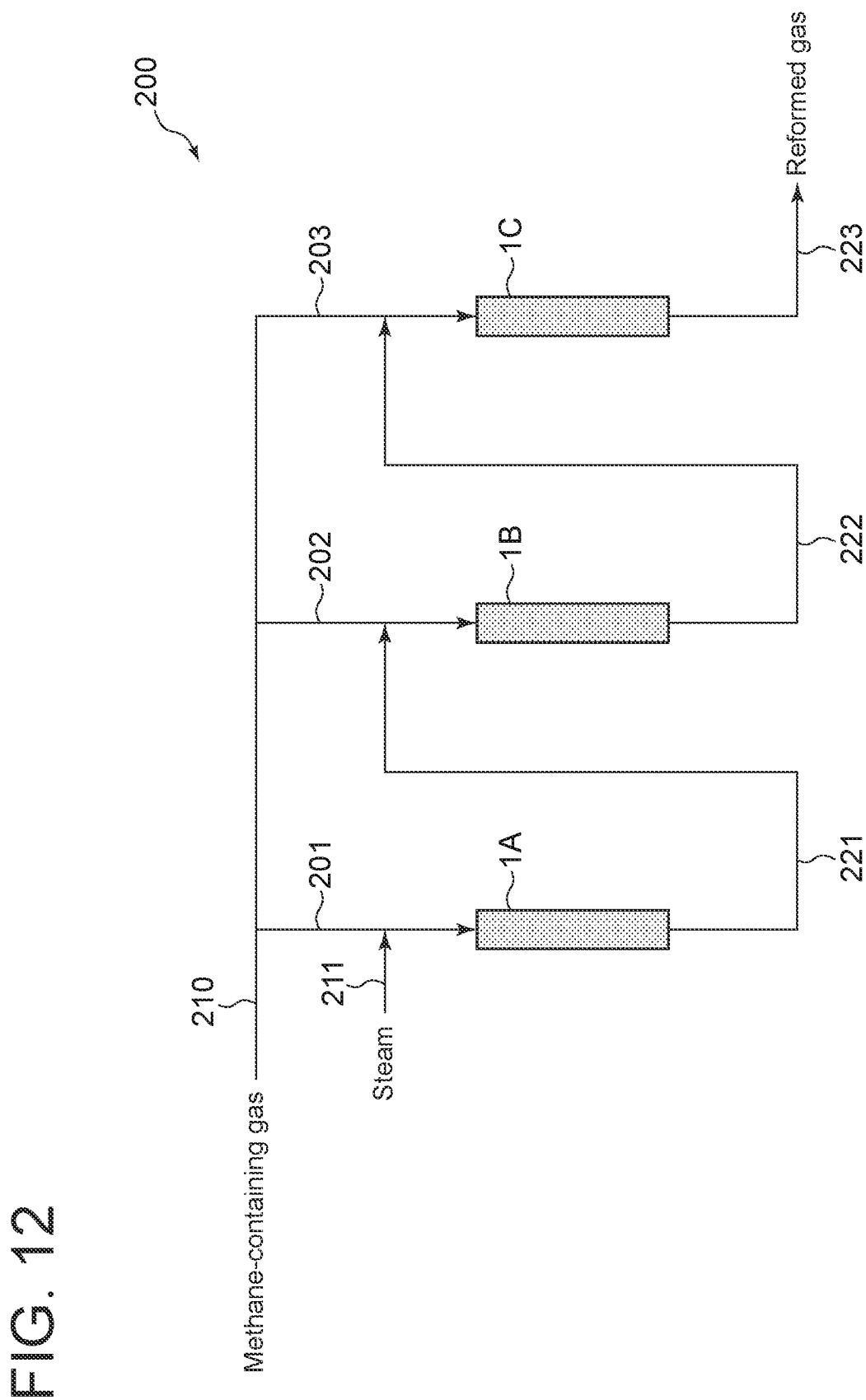
FIG. 12 is a system diagram of a reforming system according to an embodiment of the present invention.

FIG. 12 is a system diagram of a reforming system 200 according to an embodiment of the present invention. The reforming system 200 is a system for producing a reformed gas from a methane-containing gas containing methane and carbon dioxide. However, in the example shown in FIG. 12, the methane-containing gas (before adding steam through an additional steam supply system 211 described later) contains steam. The content of steam may be, for example, 2.5 in terms of content ratio (mole ratio S/C) to methane.

The reforming system 200 includes a reforming device 1 including a first reforming device 1A, a second reforming device 1B, and a third reforming device 1C, a methane-containing gas supply system 210 (first methane-containing gas supply system 201, second methane-containing gas supply system 202, and third methane-containing gas supply system 203), an additional steam supply system 211, and a first reformed gas discharge system 221. The reforming system 200 may have at least one of the reforming devices 2, 3, and 4 instead of or in addition to the reforming device 1.

The methane-containing gas supply system 210 is connected to a methane-containing gas supply source (not shown) and is configured to supply a methane-containing gas to the reforming device 1 from the methane-containing gas supply source. The methane-containing gas supply system 210 includes a first methane-containing gas supply system 201 for supplying the methane-containing gas to the first reforming device 1A, a second methane-containing gas supply system 202 for supplying the methane-containing gas to the second reforming device 1B, and a third methane-containing gas supply system 203 for supplying the methane-containing gas to the third reforming device 1C.

The first methane-containing gas supply system 201, the second methane-containing gas supply system 202, and the third methane-containing gas supply system 203 are partially shared, and the shared portion branches to the first methane-containing gas supply system 201 which is connected to the first reforming device 1A. The rest of the shared portion further branches to the second methane-containing gas supply system 202 which is connected to the second reforming device 1B and the third methane-containing gas supply system 203 which is connected to the third reforming device 1C. The first reforming device 1A, the second reforming device 1B, and the third reforming device 1C are each supplied with the same flow rate of methane-containing gas.

The additional steam supply system 211 is a system for additionally supplying steam to the methane-containing gas supplied to the first reforming device 1A. The additional steam supply system 211 is connected to a portion of the first methane-containing gas supply system 201 not shared by the second methane-containing gas supply system 202 and the third methane-containing gas supply system 203. Accordingly, the first reforming device 1A is supplied with a larger amount of steam than the second reforming device 1B and the third reforming device 1C. Specifically, for instance, steam is additionally supplied so that content ratio of steam to methane is 3 in the methane-containing gas supplied to the first reforming device 1A.

The first reformed gas discharge system 221 is a system for supplying a reformed gas produced in the first reforming device 1A and an unreacted methane-containing gas (containing carbon dioxide and steam) to the second reforming device 1B. The first reformed gas discharge system 221 is connected to the second methane-containing gas supply system 202. Further, a second reformed gas discharge system 222 is a system for supplying a reformed gas produced in the first reforming device 1A and the second reforming device 1B and an unreacted methane-containing gas (containing carbon dioxide and steam) to the third reforming device 1C. The second reformed gas discharge system 222 is connected to the third methane-containing gas supply system 203. Further, a third reformed gas discharge system 223 is a system for supplying a reformed gas produced in the first reforming device 1A, the second reforming device 1B, and the third reforming device 1C and an unreacted methane-containing gas (containing carbon dioxide and steam) to a gas holder (not shown).

In the reforming system 200, as a whole system, the amount of substance of steam supplied to the reforming device 1 is adjusted so that S/C of the methane-containing gas supplied to the reforming device 1 is 2.5 or less, preferably 2.3 or less, more preferably 2.1 or less, and the lower limit of S/C is 1 or more, preferably 1.5 or more, more preferably 1.7 or more, for example.

Deposition of solid carbon in the reforming device 1 is due to thermal decomposition of methane (see equation (1)), as described above. In a case where the methane-containing gas contains carbon monoxide, or in the second reforming device 1B and the third reforming device 1C supplied with carbon monoxide produced by reformation in the first reforming device 1A, solid carbon may be deposited according to the following equations (2) and (3). However, since the methane-containing gas contains carbon dioxide as described above, generally, the forward reaction (reaction causing deposition of solid carbon) of equation (2) is less likely to occur.

$$2CO \rightarrow C(solid) + CO_2 \qquad \text{Equation (2)}$$

$$CO + H_2 \rightarrow C(solid) + H_2O \qquad \text{Equation (3)}$$

The first reforming device 1A at the first stage (most upstream) in the reformed gas flow is additionally supplied with steam via the additional steam supply system 211. This increases the partial pressure of steam (water) and promotes reverse reaction of equation (3), consequently suppressing the carbon deposition in the first reforming device 1A. On the other hand, the second reforming device 1B and the third reforming device 1C are not additionally supplied with steam in this embodiment of the present invention.

When the methane-containing gas is divided and supplied to the three reforming devices 1, and steam is additionally supplied to only the first reforming device 1A at the first stage, the first stage has a high S/C value (e.g., S/C=3) while the overall S/C is reduced (e.g., S/C=2). Thus, as described above, by additionally supplying steam to only the first reforming device 1A while reducing S/C of the methane-containing gas, the overall S/C can be set to 2.5 or less. Consequently, it is possible to suppress the carbon deposition and further reduce the amount of steam.

Meanwhile, the second reforming device 1B at the second stage is not additionally supplied with steam in the above example, although it may be additionally supplied with steam. The reason is that the reformed gas produced in the first reforming device 1A at the first stage is supplied to the second reforming device 1B, so that the carbon deposition is suppressed with a little steam. In other words, since the second reforming device 1B is hydrogen rich, the forward reaction of equation (1) hardly proceeds, and the carbon deposition is suppressed.

On the other hand, a large amount of hydrogen may promote the forward reaction of equation (3). However, since the second reforming device 1B is supplied with steam contained in the methane-containing gas, the partial pressure of steam is high therein. Accordingly, the forward reaction of equation (3) is not likely to proceed, so that the carbon deposition derived from the forward reaction of equation (3) is suppressed.

The reformed gas produced in the first reforming device 1A may contain carbon monoxide. Accordingly, in the second reforming device 1B supplied with the reformed gas produced in the first reforming device 1A, the forward reaction of equation (2) is supposed to proceed. In fact, however, as described above, since the methane-containing gas contains carbon dioxide, the forward reaction (reaction causing deposition of solid carbon) of equation (2) is less likely to occur. Thus, the solid carbon deposition due to disproportionation of carbon monoxide as shown in equation (2) is suppressed.

The disproportionation of carbon monoxide easily occurs as the gas temperature decreases. Therefore, the temperature of the methane-containing gas introduced to the catalyst layer 12 of the reforming device 1 is preferably equal to or higher than a second temperature at which solid carbon is deposited when the gas (e.g., methane-containing gas and reformed gas) is introduced to the catalyst layer 12.

The third reforming device 1C at the third stage (most downstream with respect to the reformed gas flow) is also not additionally supplied with steam in the above example, although it may be additionally supplied with steam. The reason is that, since the third reforming device 1C at the third stage is supplied with the reformed gas from the first reforming device 1A at the first stage and the second reforming device 1B at the second stage, the partial pressure of hydrogen in the third reforming device 1C is highest among the reforming devices 1. For this reason, the carbon deposition is suppressed even if steam is not additionally supplied to the third reforming device 1C at the third stage.

In addition, since the third reforming device 1C is supplied with carbon monoxide produced by reformation in the first reforming device 1A at the first stage and the second reforming device 1B at the second stage, the partial pressure of carbon monoxide in the third reforming device 1C is higher than the other reforming devices 1. Accordingly, the forward reaction of equation (2) may proceed. However, since the third reforming device 1C is supplied with carbon dioxide contained in the methane-containing gas, the partial pressure of carbon dioxide is high therein. Accordingly, the forward reaction of equation (2) is not likely to proceed, so that the carbon deposition derived from the forward reaction of equation (2) is suppressed. Further, since the gas temperature is sufficiently high in the third reforming device 1C, the solid carbon deposition due to disproportionation of carbon monoxide is suppressed, as described above.

With the reforming system 200 described above, even if the proportion of carbon dioxide in the methane-containing gas introduced to the catalyst layer 12 is increased, the temperature is lower than the carbon deposition temperature at equilibrium, and it is possible suppress thermal decomposition of methane. Thus, even if the proportion of carbon dioxide in the methane-containing gas is increased, it is possible to achieve both an increase in hydrogen production amount and a suppression of the deposition of solid carbon. In particular, the second reforming device 1B is supplied with carbon dioxide that has not react in the first reforming device 1A. As a result, it is possible to suppress thermal decomposition of methane causing solid carbon deposits, and it is possible to further increase the hydrogen production amount.

The invention claimed is:

1. A reforming device for producing a reformed gas from a methane-containing gas containing methane and carbon dioxide, comprising:
    a reforming reaction tube containing a catalyst layer filled with a reforming catalyst for reforming the methane-containing gas;
    a spray device for spraying a cooling fluid to an outer peripheral surface of the reforming reaction tube at a position corresponding to a gas inlet of the catalyst layer in a gas flow direction; and
    wherein the spray device includes a multilayer pipe including at least a first pipe through which the methane-containing gas flows and a second pipe which is disposed concentrically around the first pipe and through which the cooling fluid flows.

2. The reforming device according to claim 1,
    wherein the second pipe opens to a combustion space of a reforming furnace including a combustor for supplying heat to the catalyst layer, and
    wherein the reforming device is configured to supply air contained in the cooling fluid to the combustion space.

3. The reforming device according to claim 1, wherein a temperature of the cooling fluid is equal to or lower than a first temperature at which solid carbon is deposited when the methane-containing gas is introduced to the catalyst layer.

4. A reforming system for producing a reformed gas from a methane-containing gas containing methane and carbon dioxide, comprising:
    a reforming device according to claim 1, the reforming device including a first reforming device and a second reforming device;
    a methane-containing gas supply system for supplying the methane-containing gas to the reforming device, the methane-containing gas supply system including a first methane-containing gas supply system for supplying the methane-containing gas to the first reforming device and a second methane-containing gas supply system for supplying methane-containing gas to the second reforming device;
    an additional steam supply system for additionally supplying steam to the methane-containing gas supplied to the first reforming device; and
    a first reformed gas discharge system for supplying a reformed gas produced in the first reforming device to the second reforming device.

* * * * *